United States Patent
Volz

(10) Patent No.: US 10,060,718 B2
(45) Date of Patent: Aug. 28, 2018

(54) MEASURING PROBE WITH ATTENUATING DEVICE FOR MEASURING THE THICKNESS OF THIN FILMS

(71) Applicant: Helmut Fischer GmbH Institut fur Elektronik und Messtechnik, Sindelfingen (DE)

(72) Inventor: Werner Volz, Sindelfingen (DE)

(73) Assignee: Helmut Fischer GmbH Institut für Elecktronik und Messtechnik, Sindelfingen (DE)

( * ) Notice: Subject to any disclaimer, the term of this patent is extended or adjusted under 35 U.S.C. 154(b) by 106 days.

(21) Appl. No.: 14/786,218

(22) PCT Filed: Apr. 24, 2014

(86) PCT No.: PCT/EP2014/058367
§ 371 (c)(1),
(2) Date: Oct. 22, 2015

(87) PCT Pub. No.: WO2014/174025
PCT Pub. Date: Oct. 30, 2014

(65) Prior Publication Data
US 2016/0076871 A1    Mar. 17, 2016

(30) Foreign Application Priority Data
Apr. 26, 2013    (DE) .......................... 10 2013 104 251

(51) Int. Cl.
*G01B 7/06* (2006.01)
*G01D 11/10* (2006.01)

(52) U.S. Cl.
CPC ............... *G01B 7/06* (2013.01); *G01B 7/105* (2013.01); *G01D 11/10* (2013.01)

(58) Field of Classification Search
CPC .......... G01B 7/06; G01B 21/22; G01B 5/061; G01B 7/105; B60G 17/019; B60G 2204/11; B60G 2400/252; G01D 11/10
(Continued)

(56) References Cited

U.S. PATENT DOCUMENTS 2,507,529 A * 5/1950 Lipson .................. G01B 7/105
324/230
3,975,829 A    8/1976 Possati
(Continued)

FOREIGN PATENT DOCUMENTS

| DE | 197 35 433 A1 | 3/1998 |
| DE | 196 49 515 A1 | 6/1998 |
| GB | 2319847 A | 6/1998 |

OTHER PUBLICATIONS

International Search Report for corresponding patent application No. PCT/EP2014/058367 dated Jul. 18, 2014.

*Primary Examiner* — Jay Patidar
(74) *Attorney, Agent, or Firm* — Renner, Otto, Boisselle & Sklar, LLP

(57) ABSTRACT

A measuring probe for the measurement of the thickness of thin layers, includes a housing, at least one sensor element which is mounted with at least one spring element to be flexible with respect to the housing, the sensor element having a spherical positioning cap pointing towards the measuring surface of an object of measurement against a touchdown direction and along a longitudinal axis thereof, and an attenuating device on the housing which acts in the touchdown direction of the at least one sensor element before the sensor element is fitted onto the measuring surface of the object of measurement and attenuates the touchdown movement of the at least one sensor element in the direction of the measuring surface of the object of measurement.

19 Claims, 2 Drawing Sheets

Figure 4A:
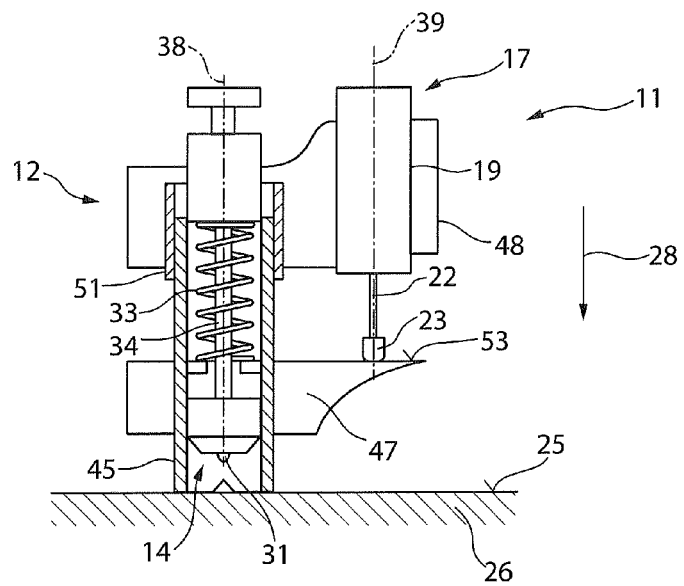

(58) Field of Classification Search
USPC .................................................. 324/229–231
See application file for complete search history.

(56) References Cited

U.S. PATENT DOCUMENTS

| | | | | |
|---|---|---|---|---|
| 5,929,633 A | * | 7/1999 | Fischer | G01B 7/105 |
| | | | | 324/230 |
| 6,011,391 A | * | 1/2000 | Nix | G01B 7/105 |
| | | | | 324/230 |
| 2003/0193346 A1 | * | 10/2003 | Jagiella | G01B 7/105 |
| | | | | 324/230 |

* cited by examiner

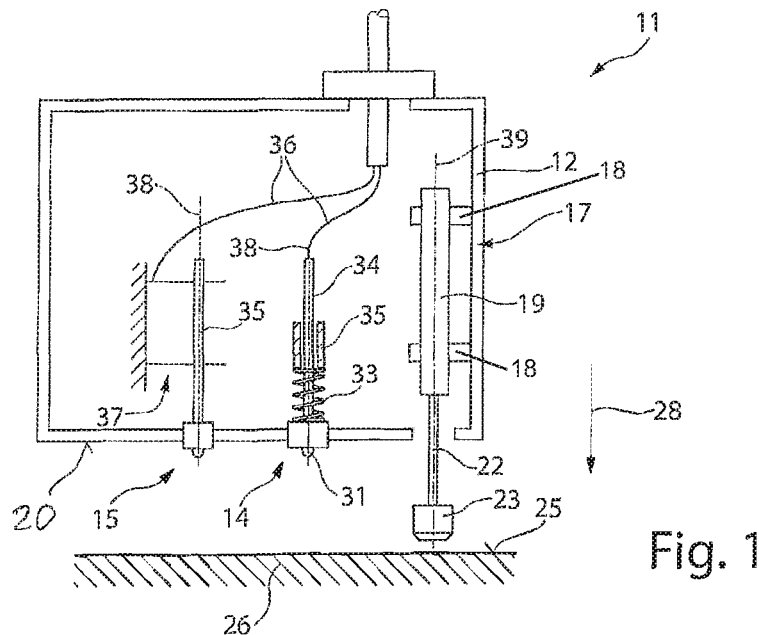
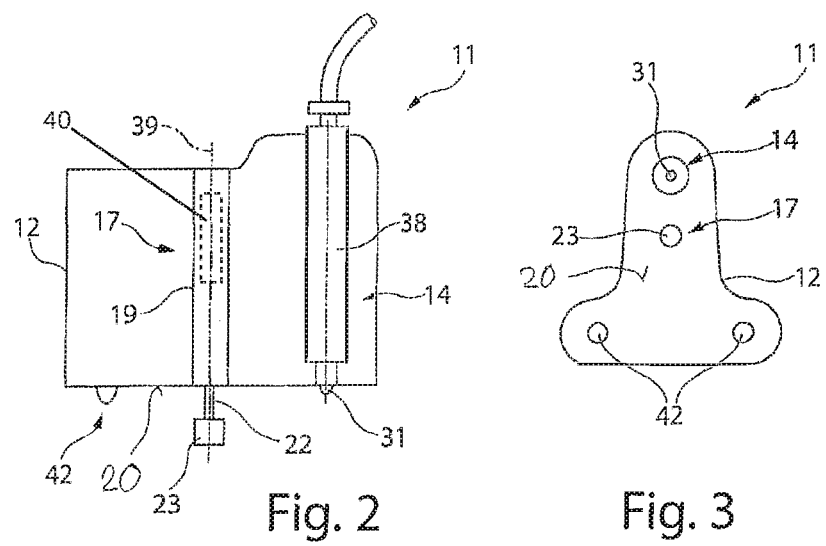
Fig. 1
Fig. 2
Fig. 3

MEASURING PROBE WITH ATTENUATING DEVICE FOR MEASURING THE THICKNESS OF THIN FILMS

The invention relates to a measuring probe for measuring the thickness of thin layers, having a housing and at least one sensor element which has a spherical positioning cap pointing towards the measuring surface of an object of measurement in the longitudinal axis thereof, said spherical positioning cap being arranged in the longitudinal axis of the sensor element and being allocated to the at least one measuring element.

A measuring probe for measuring the thickness of thin layers is known from DE 197 35 433 A1, having a housing which comprises a probe foot, and at least one sensor element arranged in the housing. The sensor element has a spherical positioning cap pointing towards the measuring surface of an object of measurement in the longitudinal axis thereof, wherein a spring element attenuates a touchdown movement of the sensor element in the direction of the measuring surface of the object of measurement.

To position the probe foot of the housing of the measuring probe on the measuring surface, in the case of this measuring probe, touchdown tips are required which are pushed into the measuring surface in order to enable a secure positioning. After the touchdown, a sliding sleeve is pushed downwards in the touchdown direction in order to bring the sensor element towards a film arranged on the lower end of the housing, which causes a pressure minimisation of the sensor element on the measuring surface. The inherent tension of the film thereby reduces the spring force of the spring element and a touchdown force of the spherical positioning cap onto the layer to be measured.

Furthermore, sensor elements are known from DE 100 14 348 B4, DE 20 2010 006 062, DE 10 2011 103 122 A1 and DE 10 2011 103 123 A1.

The requirements for the accuracy for measuring the thickness of thin layers which range from a few micrometers, in particular under 10 μm, are constantly increasing. For example, it is required to measure chromium layers on copper or zinc layers which are applied to a base body made from steel, wherein the chromium layers, for example, have less than 10 μm. Such layered structures are, for example, used in printing cylinders, in particular gravure cylinders, which are used to produce printed sheets of paper. The measurement of such layer thicknesses applied to gravure cylinders is time-consuming. Additionally, such layered structures are sensitive to pressure, and the pressure marks introduced by a measuring probe during touchdown onto the measuring surface influence the precise measurement of the layer thickness.

The object of the invention is therefore to create a measuring probe for measuring the thickness of thin layers which enables a tactile measurement of the thickness of thin layers without deformation of the measuring surface at the measuring point.

This object is solved by a measuring probe in which an attenuating device acting in the touchdown direction of the sensor element is provided, which attenuates the touchdown movement of the sensor element onto the measuring surface of an object of measurement or decelerates it in a controlled manner. Therefore, a gentle touchdown of the sensor element having the spherical positioning cap directly onto the measuring surface at the measuring point is enabled. Deformations or depressions at the measuring point are prevented, whereby the layer thickness or layer thicknesses remain in the applied form—so without deformation—and the actually present layer thickness or layer thicknesses can be determined with high precision.

The measuring probe preferably provides that the attenuating device is arranged separately to the at least one sensor element, in particular a spatial separation of the at least one sensor element from the attenuating device is provided. Due to the spatial separation of the attenuating device from the at least one sensor element and the independent functionality resulting therefrom between the attenuating device and the sensor element, a simple and flexible construction of the measuring probe is achieved. The attenuating device can be provided in the housing of the at least one sensor element or even outside of the housing.

The attenuating device of the measuring probe comprises a ram which is immersed in an attenuator against a touchdown direction of the measuring probe onto the measuring surface, wherein the immersion speed thereof is constant or decreases with an increasing immersion distance. Therefore, the speed in the touchdown direction of the sensor element is reduced, wherein, with increasing proximity of the sensor element to the measuring surface, a speed reduction is achieved and a gentle touchdown is enabled.

The attenuating device advantageously comprises a mechanical attenuator and is preferably formed as a reciprocating cylinder. Therefore, small and compactly constructed attenuators can be used.

The mechanical attenuator comprises a liquid as an attenuating medium, wherein preferably an oil is used as an attenuating medium. Alternatively, a gel or water can also be used. A gas can also be provided as an attenuating medium, such as, for example, air.

According to an alternative embodiment of the attenuating device, an electromagnetic attenuator is provided. Preferably, an eddy current attenuation is used.

Furthermore, it is preferably provided that the immersion movement of the ram of the attenuating device is in parallel to the touchdown direction of the sensor element at least at the point in time of touchdown of the sensor element. A tip-free touchdown of the sensor element can thereby be enabled.

The at least one attenuating device receives a touchdown foot at the ram, said foot projecting in the touchdown direction compared to the spherical positioning cap of the at least one sensor element according to a first embodiment. Therefore, in the case of proximity of the measuring probe, firstly the touchdown foot, which is preferably formed as a rubber boot or similar, is fitted onto the measuring surface such that, during subsequent lowering of the measuring probe for the guiding of the sensor element onto the measuring surface, an increasing attenuation effect ensues.

Preferably the immersion movement of the ram into the attenuator in parallel to the immersion movement of the at least one sensor element is provided in the housing or a sleeve. Due to the axis parallelism, a constructively simple construction as well as a simple operation and handling can furthermore be enabled.

The attenuating device is, according to one alternative, integrated into the housing which receives the sensor element. Therefore, a compact measuring probe can be created.

The sensor element is preferably received in a spring-mounted manner with respect to the housing. It can thereby be prevented that the sensor element is applied to the measuring surface with too high a touchdown force. On the other hand, it is achieved by the spring mounting that a minimum pressing force acts on the sensor element such that a secured support of the sensor element on the measuring surface at the measuring point of the object of measurement is enabled.

An alternative embodiment of the measuring probe provides that the at least one sensor element is arranged fixedly in the housing and at least one auxiliary pole is allocated to the sensor element. In this embodiment, during a touchdown movement of the measuring probe, firstly the attenuating device is brought into contact with the measuring surface of the object of measurement in order to achieve an attenuated and/or decelerated touchdown movement of the measuring probe onto the measuring surface. A tip-free arrangement of the sensor element on a measuring surface can be enabled by the at least one auxiliary pole. In particular, two auxiliary poles are provided such that a three-point support is provided together with the sensor element.

A further alternative embodiment of the invention provides that the attenuating device is releasably fastened to a receiver provided or able to be installed on the housing. Different attenuating elements are thereby able to be installed in a simple manner.

A further preferred embodiment of the invention provides that the sensor element comprises a sleeve in which the sensor element is mounted to be able to be immersed and which is able to be positioned fixedly in a housing. Existing sensor elements in a housing section can thereby be used interchangeably such that a use of different sensor elements is also enabled.

A further alternative embodiment of the measuring probe provides that the sensor element is arranged in a touchdown sleeve which is open downwards, in which the sensor element is able to be immersed, wherein the sleeve is firmly arranged on a first or further housing section of the housing at which the ram of the attenuating device as well as a second or upper housing section is brought into firm contact with the attenuator and the sensor element. In this embodiment, firstly a sleeve of the sensor element is applied to the measuring surface and subsequently the touchdown movement of the sensor element which is executed directly onto the measuring surface is attenuated by the attenuating device.

In the case of the measuring probe for measuring the thickness of thin layers, sensor elements can be used in which at least one measuring element is formed as a coil and/or as a Hall sensor, which works to measure the layer thickness according to the magnetic-induction method and/or according to the eddy current method, according to the phase-sensitive method or according to a magnetic DC field method. Capacitive sensors are also conceivable.

The invention, as well as further advantageous embodiments and developments of the same are described and explained below in more detail by means of the examples depicted in the drawings. The features to be gleaned from the description and the drawings can be applied individually or together in any combination according to the invention. Here are shown:

FIG. 1 a schematic sectional view of a first embodiment according to the invention, FIG. 2 a schematic sectional view of an alternative embodiment to FIG. 1, FIG. 3 a schematic view from below onto the embodiment according to FIG. 2, FIGS. 4a and 4b schematic sectional views of a further alternative embodiment in two different working positions.

In FIG. 1, a first embodiment of the measuring probe 11 according to the invention is depicted. This measuring probe 11 comprises a housing 12 in which at least one sensor element 14, 15 as well as at least one attenuating device 17 are provided, wherein the at least one sensor element 14, 15 is arranged with regard to the housing 12 or with regard to a housing wall 20 of the housing 12 to be at least partially protruding. The sensor elements 14, 15 are preferably allocated to the same housing wall 20 on the housing 12. The attenuating device 17 is integrated, for example, completely into the housing 12. Alternatively, this can also be arranged to be partially or completely outside of the housing 12, in particular releasably fastened, such as by coupling the attenuating device 17 to a receiver 18 provided on the housing 12.

The attenuating device 17 comprises a mechanical attenuator 19 which is formed, according to the exemplary embodiment, as a reciprocating cylinder, in which a ram 22 is guided to be able to be immersed. A touchdown foot 23 is provided on the free end of the ram 22, said foot protruding compared to the housing 12 or the housing wall 20 further than the at least one partially protruding sensor element 14, 15. This touchdown foot 23 can, for example, be formed from a soft plastic material.

The attenuating device 17 comprises, according to a first embodiment, a liquid as an attenuating medium, in particular oil. Alternatively, a gel, water or air can also be used. Alternatively, the attenuating device can also be formed as an eddy current brake.

In the case of the attenuating device 17, with increasing immersion movement of the ram 22 into the attenuator 19, a deceleration in the immersion speed occurs, i.e. that after the touchdown of the touchdown foot 23 onto a measuring surface 25 of an object of measurement 26, an infeed rate of the housing 12 in the touchdown direction 28 is increasingly reduced. The lifting movement in the touchdown direction 28 is decelerated most strongly directly before the touchdown of the at least one sensor element 14, 15 onto the measuring surface 25.

Alternatively, the attenuating device 17 can also have a constant attenuation over the lifting distance.

According to a first embodiment, the at least one sensor element 14, 15 is mounted to be flexible relative to the housing 12. In the case of direct touchdown of a spherical positioning cap 31 of the sensor element 14, 15, which points towards the measuring surface 25, onto the measuring surface 25 of the object of measurement 26, the sensor element 14, 15 can be immersed at least slightly into the housing 12.

The flexible mounting of the sensor elements 14, 15 relative to the housing 12 can be varied. Two mounting types are depicted by way of example, wherein the mounting of the at least one sensor element 14, 15 is not limited to these.

In the case of the sensor element 14, for example a flexible mounting with a return spring 33 is depicted which surrounds a shaft 34 which is guided into a socket 35.

In the case of the sensor element 15, for example, a spring mounting using two leaf spring elements 37 aligned in parallel to each other is provided in order to control a flexibility.

The at least one sensor element 14, 15 is connected to a measuring device respectively, which is not depicted in greater detail, via an electrical connection line 36, said measuring device receiving the detected measured values and emitting and/or further processing determined data and/or displaying it on a display.

The longitudinal axis 38 of the at least one sensor element 14, 15 is advantageously aligned in parallel to the longitudinal axis 39 of the attenuating device 17 such that the movement directions of the at least one sensor element 14, 15 and the ram 22 of the attenuating device 17 are in parallel to the touchdown direction 28.

The individual probes are selected and adapted depending on the coating of the object of measurement as well as the base material of the object of measurement 26. For example, a measuring probe according to DE 100 14 348 B4 can be used, which is referenced in its full scope. Furthermore, measuring probes according to D 10 2011 103 122 A1, DE 10 2011 103 123 A1 and DE 10 2005 054 593 A1 as well as measuring probes according to DE 20 2010 006 062 U1 can be used, which are likewise referenced in their full scope.

For example, the sensor element 14 has a first and a second coiling device as a measuring element, each having at least one coil. Such sensor elements enable a measurement according to the magnetic-induction method. The magnetic-induction method is suitable for measurement of the thickness of non-ferrous metallic layers, such as, for example, chromium, copper, zinc or similar on magnetisable base materials, such as, for example, steel and iron, as well as for painted, lacquer and plastic layers on magnetisable base materials, such as, for example, steel and iron. The measuring region lies, for example, at a layer thickness of a few micrometers to 1,800 µm, wherein preferably a frequency of less than 300 Hz is used. Such a sensor element also enables the implementation of the measurement according to the eddy current method, i.e. that the measurement of the thickness of electrically non-conductive layers on non-ferrous metals, such as, for example, paints, lacquers, plastics on aluminium, copper, tin, stainless steel or anodised layers on aluminium in a high-frequency alternating field is enabled. Such a probe can be used as a dual measuring probe.

Furthermore, the at least one sensor element 14, 15 can detect a layer thickness using a first coil surrounding the longitudinal axis 38 and also a curvature of the measuring surface of the object of measurement using a second coil which surrounds the first coil and can be compensated for during the calculation of the layer thickness. In particular in the case of curved surfaces, such as, for example in the case of coated rollers or similar, the measurement of the layer thickness can be specified. Furthermore, the at least one sensor element 14, 15 can comprise only one Hall sensor or at least one coil and a Hall sensor.

The measuring probe 11 depicted in FIG. 1 can, for example, be manually fitted onto an object of measurement 26, wherein firstly the touchdown foot 23 of the attenuating device 17 and subsequently the at least one sensor element 14, 15 is fitted onto the measuring surface 25, attenuated by the attenuating device 17. Alternatively, this housing 12 of the measuring probe 11 can be mounted on a tripod and can be guided to the object of measurement 26 manually or by means of a motor. Furthermore, the measuring probe 11 can also be fastened to a mount or a stand having a prismatic foot instead of a tripod, such that the measuring probe 11 can also be fitted onto an object of measurement 26 having a curved measuring surface in order to subsequently implement a measurement at determined measuring points on the object of measurement 26, wherein the guiding of the sensor element 14, 15 or of the housing 12 in the touchdown direction 28 towards the measuring point can in turn occur manually or by means of a motor.

In the case of the arrangement of, for example, two sensor elements 14, 15 in a measuring probe 11, measuring tasks for a layer construction can be implemented which, for example, have three coatings on a base body. For example, an uppermost layer can be chromium, lying thereunder a zinc layer and this in turn can be supported on a copper layer, wherein the copper layer is applied to a base body made from steel. Additionally, a curvature compensation can also be implemented by the at least one sensor element 14, 15. This is in particular then required if such a layer construction is applied to a roller, in particular a printing roller.

The embodiment of the measuring probe 11 depicted in FIG. 1 can also be modified to the effect that only one sensor element or three or even more sensor elements of the same and/or different construction are provided in the housing 12.

In FIG. 2, an alternative embodiment of the measuring probe 11 is depicted in a schematic side view and in FIG. 3 in a view from below. In this embodiment of the measuring probe 11, the sensor element 14 and the attenuating device 17 are arranged in the housing 12. At least one, preferably two auxiliary poles 42 are arranged at a distance to each other on the lower side 41 of the housing 12. The sensor element 14 forms a third pole 31, such that a three-pole support of the measuring probe 12 on the measuring surface 25 of the object of measurement 26 is provided. In this embodiment, the sensor element 14 is arranged fixedly in the housing 12.

The attenuating device 17 is advantageously arranged within a surface formed by the three poles 42, 31. The longitudinal axis 38 of the sensor element 14 and the longitudinal axis 39 of the attenuating device 17 are preferably in turn aligned in parallel to each other. The touchdown foot 23 advantageously protrudes compared to the spherical positioning cap 31 of the sensor element 14 seen in the touchdown direction 28. Alternatively, the attenuating device 17 can also be fastened separately to an outer side of the housing 12. Furthermore, according to another alternative embodiment, the attenuation device may include an electromagnetic attenuator (shown diagrammatically at 40), for example, an eddy current attenuation may be used.

Figure 4B:
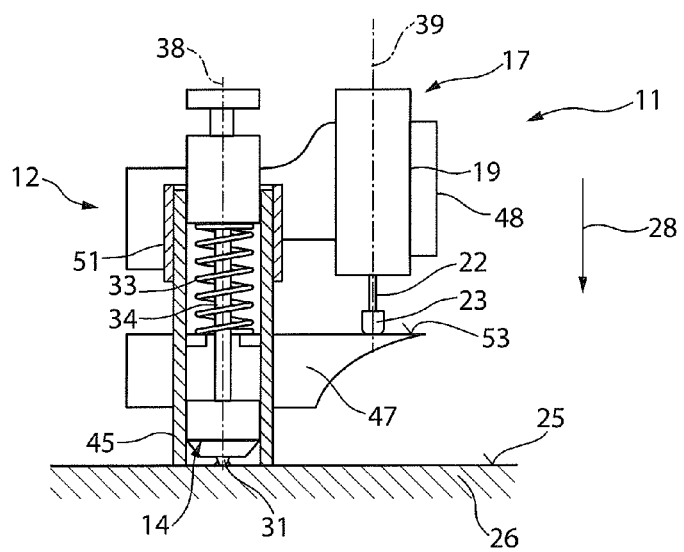

In FIGS. 4a and 4b, a schematic cross-sectional depiction of an alternative embodiment of the measuring probe 11 to the above FIGS. 1 to 3 is depicted. This measuring probe 11 comprises a sensor element 14 which is mounted to be moveable in a sleeve 45 which is open downwards. Such a construction of a sensor element 14 is, for example, known from DE 100 14 348 B4, to which reference is made in turn in its full scope. The housing 12 of the measuring probe is formed in two parts and has a lower section 47 which is brought into firm contact with the outer periphery of the sleeve 45. An upper section 48 of the housing 12 is provided fixedly on a guide sleeve 51 which surrounds the sleeve 45 and moves the sensor element 14 back and forth within the sleeve 45. Furthermore, the attenuating device 17 is fastened to the upper housing section 48, which is supported on a contact surface 53 on the lower housing section 47 with the ram 22 and the touchdown foot 23. The following functionalities result from this:

Firstly the measuring probe 11 according to FIG. 4a is guided in the touchdown direction 28 onto the measuring surface 25 of the object of measurement 26 such that the sleeve 45 comes into contact with the measuring surface 25. The sensor element 14 having the spherical positioning cap 31 thereof is lifted compared to the measuring position itself. Subsequently, the upper housing section 48 is moved further towards the lower housing section 47 in the touchdown direction, wherein the attenuating device 17 reduces or decelerates the thus initiated lowering movement of the sensor element 14 via the guide sleeve 51 directly onto the measuring surface 25. A gentle touchdown of the spherical positioning cap 31 of the sensor element 14 at the measuring position of the object of measurement 26 can thereby occur, as is depicted in FIG. 4b. The sleeve 45 is therein immersed in the guide sleeve 51, wherein at the same time the distance between the upper and the lower housing section 47, 48 is also reduced.

After the implementation of the measurement, the measuring probe 11 is lifted from the measuring surface 25 of the object of measurement 26, wherein the return spring 33 moves the sensor element 17 back opposite a touchdown-side front side of the sleeve 45, such that the sensor element 14 is immersed in the sleeve 45 and is positioned to be secured from damages.

All aforementioned features are each fundamental to the invention in themselves and can be combined with one another in any combination.

The invention claimed is:

1. A measuring probe for the measurement of the thickness of thin layers, comprising:
   a housing,
   at least one sensor element which is mounted with at least one spring element to be flexible with respect to the housing, the sensor element having a spherical positioning cap pointing in a touchdown direction towards a measuring surface of an object of measurement, and
   an attenuating device on the housing which acts to attenuate the movement of the at least one sensor element in the touchdown direction before the at least one sensor element touches down onto the measuring surface of the object of measurement,
   wherein the attenuating device has a ram, and the at least one sensor element is provided to be displaceable in the housing in the touchdown direction, and an immersion movement of the ram of the attenuating device is provided in parallel to an immersion movement of the at least one sensor element in the housing.

2. The measuring probe according to claim 1, wherein the attenuating device is arranged separately to the at least one sensor element.

3. The measuring probe according to claim 2, wherein the attenuating device is arranged spatially separately to the at least one sensor element.

4. The measuring probe according to claim 1, wherein the immersion movement of the ram includes an immersion speed and an immersion distance, the immersion speed remaining constant or decreasing with increasing immersion distance.

5. The measuring probe according to claim 4, wherein the immersion movement of the ram of the attenuating device is parallel to the touchdown direction of the at least one sensor element at least at the point in time of touchdown of the at least one sensor element onto the measuring surface.

6. The measuring probe according to claim 1, wherein the attenuating device comprises a mechanical attenuator.

7. The measuring probe according to claim 6, wherein the mechanical attenuator has a liquid or gas as an attenuating medium.

8. The measuring probe according to claim 7, wherein the attenuating device is formed as a reciprocating cylinder.

9. The measuring probe according to claim 1, wherein the attenuating device has an electromagnetic attenuator.

10. The measuring probe according to claim 9, wherein the electromagnetic attenuator is formed as an eddy current attenuator.

11. The measuring probe according to claim 1, wherein the at least one attenuating device has a touchdown foot which protrudes in the touchdown direction compared to the spherical positioning cap of the at least one sensor element.

12. The measuring probe according to claim 1, wherein the attenuating device is arranged in the housing having the at least one sensor element.

13. The measuring probe according to claim 1, wherein the at least one sensor element is received fixedly in the housing and at least one auxiliary pole is arranged on the housing on a same side as the at least one sensor element.

14. The measuring probe according to claim 1, wherein the attenuating device is fastened releasably to a receiver which is arranged on the housing.

15. The measuring probe according to claim 1, wherein the sensor element is mounted to be immersed in a sleeve which is arranged fixedly on the housing.

16. The measuring probe according to claim 1,
   wherein the sensor element is configured to be immersed in a sleeve,
   wherein the sleeve is arranged on a lower housing section of the housing,
   wherein the ram of the attenuating device is configured to be brought into contact with the lower housing section,
   wherein an upper housing section of the housing is configured to be brought into firm contact with the attenuating device, and
   wherein a guide sleeve is configured to receive the sensor element.

17. The measuring probe according to claim 1, wherein at least one measuring element of the sensor element comprises a coil or a Hall sensor or both and the sensor element for measuring the thickness of thin layers enables a measurement according to the magnetic-induction method or according to the eddy current method or both, or according to the phase-sensitive method or according to a magnetic DC field method.

18. A measuring probe for the measurement of the thickness of thin layers, comprising:
   a housing,
   at least one sensor element which is mounted with at least one spring element to be flexible with respect to the housing, the sensor element having a spherical positioning cap pointing in a touchdown direction towards a measuring surface of an object of measurement, and
   an attenuating device on the housing which acts to attenuate the movement of the at least one sensor element in the touchdown direction before the at least one sensor element touches down onto the measuring surface of the object of measurement,
   wherein the attenuating device comprises a mechanical attenuator, and
   wherein the mechanical attenuator has a liquid or gas as an attenuating medium.

19. A measuring probe for the measurement of the thickness of thin layers, comprising:
   a housing,
   at least one sensor element which is mounted with at least one spring element to be flexible with respect to the housing, the sensor element having a spherical positioning cap pointing in a touchdown direction towards a measuring surface of an object of measurement, and
   an attenuating device on the housing which acts to attenuate the movement of the at least one sensor element in the touchdown direction before the at least one sensor element touches down onto the measuring surface of the object of measurement,
   wherein the attenuating device has a ram,
   wherein an immersion movement of the ram includes an immersion speed and an immersion distance, the immersion speed remaining constant or decreasing with increasing immersion distance, and wherein the immersion movement of the ram of the attenuating device is parallel to the touchdown direction of the at least one sensor element at least at the point in time of touchdown of the at least one sensor element onto the measuring surface.

\* \* \* \* \*